United States Patent
Wainwright

(10) Patent No.: US 11,590,855 B2
(45) Date of Patent: Feb. 28, 2023

(54) ELECTRIC VEHICLE FAST CHARGING AND BATTERY COOLING SYSTEM USING A CHARGER COOLED FLUID-TO-BATTERY COOLED FLUID HEAT EXCHANGE DEVICE

(71) Applicant: Hanon Systems, Daejeon (KR)

(72) Inventor: Ian Wainwright, Chelmsford (GB)

(73) Assignee: HANON SYSTEMS, Daejeon (KR)

( * ) Notice: Subject to any disclaimer, the term of this patent is extended or adjusted under 35 U.S.C. 154(b) by 447 days.

(21) Appl. No.: 16/691,928

(22) Filed: Nov. 22, 2019

(65) Prior Publication Data

US 2020/0338998 A1 Oct. 29, 2020

Related U.S. Application Data

(60) Provisional application No. 62/839,119, filed on Apr. 26, 2019.

(51) Int. Cl.
| | |
|---|---|
| *B60L 53/302* | (2019.01) |
| *B60L 58/26* | (2019.01) |
| *B60L 53/66* | (2019.01) |
| *B60K 6/28* | (2007.10) |

(52) U.S. Cl.
CPC .............. *B60L 53/302* (2019.02); *B60L 53/66* (2019.02); *B60L 58/26* (2019.02); *B60K 6/28* (2013.01); *B60Y 2200/91* (2013.01); *B60Y 2200/92* (2013.01); *B60Y 2300/91* (2013.01)

(58) Field of Classification Search
CPC ........ B60L 53/302; B60L 53/66; B60L 58/26; B60K 6/28

USPC .......................................................... 320/109
See application file for complete search history.

(56) References Cited

U.S. PATENT DOCUMENTS

| | | | |
|---|---|---|---|
| 8,098,044 B2 | 1/2012 | Taguchi | |
| 8,350,526 B2 | 1/2013 | Dyer et al. | |
| 2012/0043935 A1* | 2/2012 | Dyer | B60L 53/31 |
| | | | 320/109 |
| 2015/0306974 A1* | 10/2015 | Mardall | H01M 10/625 |
| | | | 429/120 |
| 2017/0096073 A1 | 4/2017 | Mardall et al. | |
| 2018/0304757 A1* | 10/2018 | Vaughan | F28D 15/00 |
| 2019/0109409 A1* | 4/2019 | Fuehrer | H01R 13/533 |

FOREIGN PATENT DOCUMENTS

| | | | | |
|---|---|---|---|---|
| DE | 102011100389 A1 * | 5/2012 | ............. | H01B 7/425 |
| DE | 102012220218 A1 * | 5/2014 | .......... | B60L 11/1816 |
| DE | 102017217506 A1 * | 4/2019 | | |
| WO | WO-2017076545 A1 * | 5/2017 | ............ | B60L 53/302 |

* cited by examiner

*Primary Examiner* — Jerry D Robbins
(74) *Attorney, Agent, or Firm* — Shumaker, Loop & Kendrick, LLP; James D. Miller

(57) ABSTRACT

A vehicle battery charging system includes a battery charger for charging a battery module of a vehicle. A first coolant circuit conveys a first cooling fluid therethrough. The first coolant circuit includes a chiller unit separate from the vehicle. The chiller unit and the first cooling fluid exchange heat therebetween. A second coolant circuit conveys a second cooling fluid therethrough. The second coolant circuit includes a battery module. The battery module and the second cooling fluid exchange heat therebetween. A heat exchanger exchanges heat between the first cooling fluid and the second cooling fluid.

18 Claims, 3 Drawing Sheets

ELECTRIC VEHICLE FAST CHARGING AND BATTERY COOLING SYSTEM USING A CHARGER COOLED FLUID-TO-BATTERY COOLED FLUID HEAT EXCHANGE DEVICE

CROSS-REFERENCE TO RELATED PATENT APPLICATION

This patent application claims priority to U.S. Provisional Patent Application Ser. No. 62/839,119 filed on Apr. 26, 2019, the entire disclosure of which is hereby incorporated herein by reference.

FIELD

The invention relates generally to a vehicle battery charging system including battery cooling features and, more particularly, to a fast vehicle battery charging system including a common heat exchanger exchanging heat between a vehicle and a cooling fluid chiller in a charging unit, wherein the chiller provides the cooling fluid to the heat exchanger through a no-drip connector and the heat exchanger uses the cooling fluid to change the temperature of a battery coolant flowing through a battery coolant loop.

BACKGROUND

Electric vehicles are becoming increasingly more prevalent. Electric vehicles include hybrid electric vehicles, such as the extended range electric vehicles (EREV), that combine a battery and a main power source, such as an internal combustion engine, fuel cell systems, etc., and electric only vehicles, such as the battery electric vehicles (BEV). The battery or batteries in the electric vehicles can be different battery types, such as lithium-ion, nickel metal hydride, lead-acid, etc. A typical high voltage battery system for an electric vehicle may include several battery cells or battery modules to provide the vehicle with power and energy requirements, where each battery module may include a certain number of battery cells, such as twelve battery cells, for example.

Hybrid electrical vehicles employ the main power source in combination with the battery to allow the vehicle to travel further distances than electric only vehicles. Electric only vehicles have a certain driving range or possible total distance the vehicle can travel corresponding to a full battery charge. Therefore, in order to accommodate vehicle trips requiring travel beyond the driving range of the vehicle, a battery charging station infrastructure with a battery charger is required to allow travelers to charge the batteries of their vehicles when needed. These charging stations need to include fast battery chargers so that the vehicle batteries can be recharged in a reasonable and convenient amount of time. Such charging stations may employ direct current (DC) or alternating current (AC) charging capabilities depending on a type of charging system and batteries being employed in the vehicle.

During fast charging of an electric vehicle battery there is a significant amount of heat that is generated in the battery. The amount of heat generated is the result of increased power being used that needs to be removed from the battery to prevent the battery from being damaged, which can reduce battery life. Control circuitry is typically employed on the vehicle to monitor the temperature of the battery and reduce or stop the charging of the battery if the battery reaches an undesirable temperature. A conventional approach to address the excessive heat is to cool the battery during battery charging by circulating a cooling fluid through flow channels in the battery and then removing the heat from the cooling fluid using the vehicle's cooling and air conditioning system. Since the vehicle is not moving during battery charging, the vehicle fan needs to be operated at a high speed to cool the cooling fluid after it has been heated, which generates significant undesired noise and power and energy waste. Additionally, the cooling fluid flowing to the battery creates an undesirably large coolant circuit flowing from a coolant source, wherein the coolant must flow an undesirably further distance making the cooling of the battery less efficient than having the coolant flow from the coolant source along a shorter distance.

As the need for ever faster battery charging increases, the amount of power being transferred from the battery charging system to the battery is increasing due to an increase in size of the battery or increase in voltage or current. The increase in the amount of power results in the increased amount of heat to the battery. With the increased amount of heat, removal of the increased amounts of heat is required from the battery to keep the battery within safe operating conditions. The ability for the vehicle cooling and air conditioning system to remove the increasingly higher amounts of heat is being challenged. When the cooling and air conditioning system is unable to remove the increased amounts of heat, the rate at which the battery is charged will be de-rated to protect the battery and the longevity thereof. As a result, longer undesired time intervals for charging the battery may occur. Additionally, employing the fan of the air conditioning system creates undesired levels of noise, which can be particularly a nuisance in residential locations.

The amount of current required for fast charging the battery over the desired time interval is directly proportional to the size or diameter of a charging cable of the charging system. The certain size or diameter of the cable is required to accommodate the current passing there through so the cable does not melt. As the size of the cable increases in response to the reduced charging time and the increased current, the cable becomes less manageable and inconvenient to handle. Therefore, it is desired to cool the cable using a cooling fluid flowing around the cable. It would be particularly advantageous to employ a cooling fluid at the charging stations to cool the battery as well. To do so, cross-contamination of the cooling fluid with fluids already in the battery system may be needed to be avoided. Additionally, it would be undesired to leave undesired amounts of fluids from the charging stations in the vehicle after charging. A coolant circuit conveying the cooling fluid from the charging station must not be too long as an incomplete coolant fill may result which could affect the amount of air traps formed in the coolant circuit. Air traps or air trapped in the coolant circuit can result in thermal transfer inefficiency or overheating of the coolant fluid circuit system.

Therefore, it is desired to provide a vehicle battery charging system vehicle that includes a chiller of a charging station and a vehicle heat exchanger to transfer heat between a first coolant circuit including the chiller and a second coolant circuit including a battery of a vehicle. It is desired the system militates against cross-contamination of battery system fluids, maximizes efficiency of fast charging the battery, and minimizes noise, cost and vehicle packaging space.

SUMMARY

In accordance and attuned with present disclosure a vehicle battery charging system vehicle that includes a chiller of a charging station and a vehicle heat exchanger to transfer heat between a first coolant circuit including the chiller and a second coolant circuit including a battery of a vehicle has been surprising discovered The system militates against cross-contamination of battery system fluids, maximizes efficiency of fast charging the battery, and minimizes noise, cost and vehicle packaging space.

According to an embodiment of the disclosure, a vehicle battery charging system includes a battery charger for charging a battery module of a vehicle. A first coolant circuit conveys a first cooling fluid therethrough. The first coolant circuit includes a chiller unit separate from the vehicle. The chiller unit and the first cooling fluid exchange heat therebetween. A second coolant circuit conveys a second cooling fluid therethrough. The second coolant circuit includes a battery module. The battery module and the second cooling fluid exchange heat therebetween. A heat exchanger exchanges heat between the first cooling fluid and the second cooling fluid.

According to another embodiment of the disclosure, a vehicle battery charging system is disclosed. The charging system includes a battery charger and a chiller unit. The chiller unit is fluidly connected to a first delivery line and a first return line. A battery module of a vehicle is separate from and electrically coupleable to the battery charger by an electrical line. A heat exchanger is in fluid communication with the battery module. The heat exchanger is fluidly connected to a second delivery line and second return line. The second delivery line and the second return line is in fluid noncommunication with the battery module. A pair of cooling connectors couples the first delivery line to the second delivery line and the first return line to the second return line.

According to yet another embodiment of the disclosure, a vehicle battery charging system for charging a battery module on a vehicle is disclosed. The vehicle battery charging system includes a battery charger for providing power to charge the battery module, a first charging connector connected to the battery charger by a battery charger electrical line, and a second charging connector connected to the battery module by a vehicle electrical line. The second charging connector and the first charging connector are releasably coupled with each other to electrically couple the battery charger electrical line to the vehicle electrical line. A chiller unit holds a first cooling fluid. A first cooling connector receives a cold flow of the first cooling fluid from the chiller unit through a delivery line and provides a hot flow of the first cooling fluid to the chiller unit through a return line. A second cooling connector is releasably coupled to the first cooling connector and receives the cold flow of the first cooling fluid from the first cooling connector and conveys the hot flow of the first cooling fluid to the first cooling connector. A heat exchanger of the vehicle receives the cold flow of the first cooling fluid from the second cooling connector and conveys the hot flow of the first cooling fluid to the second cooling connector. The heat exchanger receives a hot flow of a second cooling fluid from the battery module and conveys a cold flow of the cooling fluid to the battery module. The heat exchanger transfers heat from the hot flow of the second cooling fluid to the cold flow of the first cooling fluid.

DRAWINGS

The above, as well as other objects and advantages of the invention, will become readily apparent to those skilled in the art from reading the following detailed description of an embodiment of the invention when considered in the light of the accompanying drawing which:

DETAILED DESCRIPTION

Figure 1:
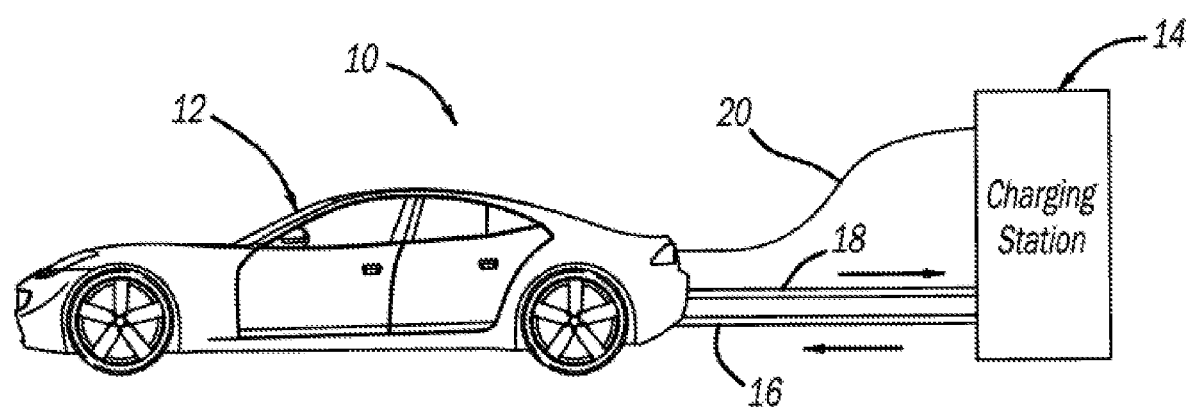
FIG. 1 is a schematic front elevational view of a vehicle charging system including a vehicle and a charging station.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The following discussion of the embodiments of the disclosure directed to a vehicle battery charging system including battery cooling features is merely exemplary in nature, and is in no way intended to limit the disclosure or its applications or uses.

This disclosure describes a solution to either overcome the need for in-vehicle electric vehicle battery cooling during fast charging or assists the in-vehicle battery cooling function enabling faster charging rates. The solution uses the fluid coolant that many fast chargers are now using to cool the charging cable and terminals to remove heat from the battery. Fast chargers are sometimes fitted with coolant circuits that circulate coolant to cool the charge cables and terminals to allow higher charger power, without increasing the cross-sectional area of the cable, which would make the cable more difficult to manipulate by the customer.

As will be discussed in detail below, this disclosure describes using a coolant-to-coolant heat exchanger on the vehicle that allows coolant from the fast charger unit to enter the vehicle pass through the heat exchanger while coolant from the battery is circulated in the same heat exchanger and the coolant circuits are kept separate. Connection between fluid lines from the fast chargers (flow and return) and the vehicle to the heat exchanger will be self-sealing and non-drip type. A small volume of fluid from the charger would remain in the vehicle heat exchanger circuit between charges requiring standardization of fluid in chargers using this process.

This development should reduce the noise generated at the electric vehicle while fast charging as the coolant fans in the vehicle will not have to run at such a high speed—this will be a benefit at, for example, domestic charging points in residential areas, or where there are multiple charging points with a number of vehicles being fast charged simultaneously. Coolant can be used to cool the vehicle connector socket terminals and electrical cables from the connector to the vehicle charging circuit to reduce operating temperatures, allow vehicle manufacturers to reduce the thickness of the cabling and enable higher charge rates. Dependent on electric vehicle circuit design there is a potential to install in the vehicle cooling system a heat exchanger that is a coolant-to-coolant-to-coolant heat exchanger rather than two coolant-to-coolant heat exchangers, thus saving space and cost in the vehicle cooling system. The system can also be used to heat the battery circuit in very cold conditions using heat provided by the charger unit.

As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
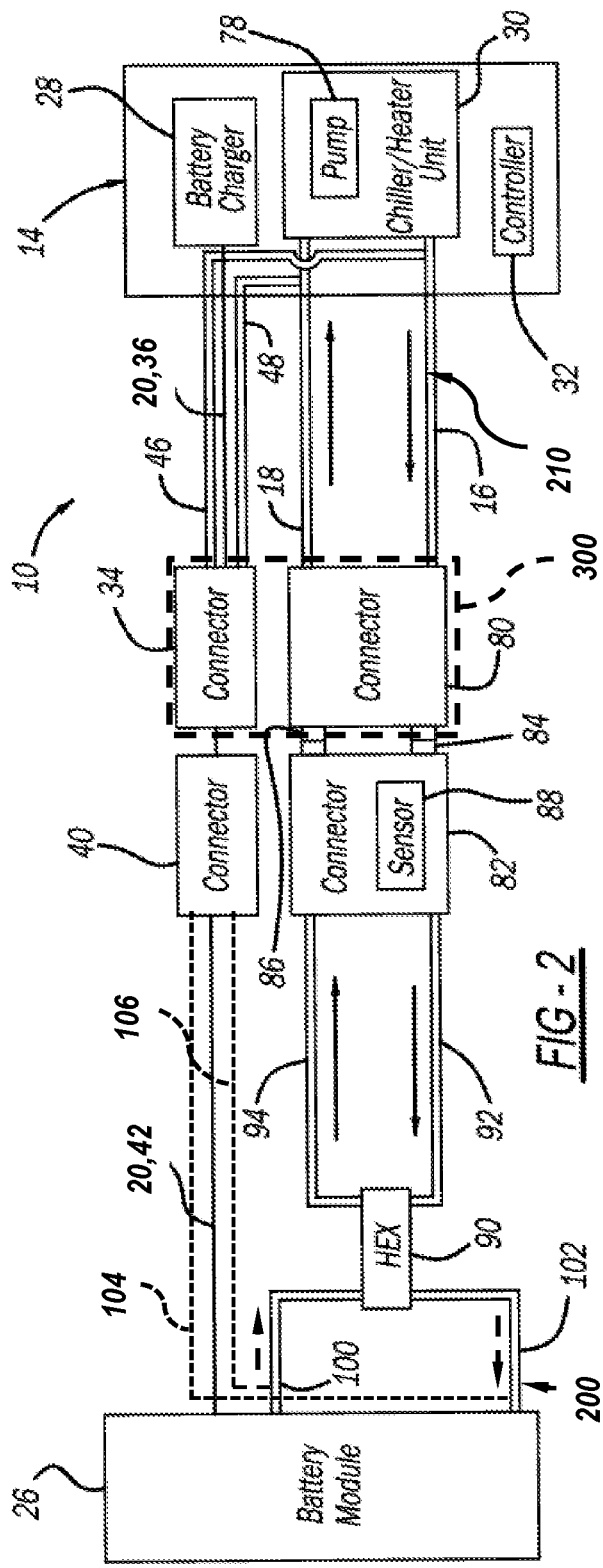
FIG. 2 is a schematic block diagram of the vehicle charging system shown in FIG. 1.

FIGS. 1-2 illustrate an electric vehicle charging system 10 for charging a battery module 26 on an electric vehicle 12 using a fast charging station 14. The electric vehicle 12 is configured as any electric vehicle including a battery module such as hybrid electric vehicles, such as the extended range electric vehicles (EREV), that combine a battery and a main power source, such as an internal combustion engine, fuel cell systems, etc., and electric only vehicles, such as the battery electric vehicles (BEV). The battery, batteries, or the battery module 26 in the electric vehicle 12 can be of any battery type, such as lithium-ion, nickel metal hydride, lead-acid, etc. The battery module 26 may include a certain number of battery cells, such as twelve battery cells, for example. Although, it is understood, the battery module 26 may include fewer than or more than twelve battery cells, if desired.

As will be discussed in detail below, the charging system 10 includes two separate connections between the vehicle 12 and the charging station 14, where one connection is an electrical connection provided by an electrical line, wire, or cord 20 for charging the battery module 26. A second connection is a cooling fluid connection for conveying a flow of a first cooling fluid (indicated by the solid arrows) between the vehicle 12 and the charging station 14. The first cooling fluid can be any cooling fluid such as water, air, glycol, dielectric fluid, refrigerant, coolant, any other cooling fluid, or combination thereof.

The second connection includes a delivery line 16 that delivers the first cooling fluid from the charging station 14 to the vehicle 12 and a return line 18 that delivers the first cooling fluid from the vehicle 12 to the charging station 14. While the lines 16, 18 are shown separated, in an alternate configuration, the lines 16, 18 can be combined into a single outer tubing, concentrically formed tubing or conduit, or conduits formed directly adjacent each other.

FIG. 2 shows the charging system 10, wherein the vehicle 12 is not shown but the battery module 26 of the vehicle 12 is shown. The charging station 14 includes the battery charger 28 that includes all of the power sources, controls, sensors, alternate current (AC) to direct current (DC) converters and other power sources, as desired, for any fast battery charger, whether it is an AC charger or DC charger, suitable for the purposes discussed herein. The charging station 14 also includes a chiller unit 30. The chiller unit 30 is configured as a chiller/heater unit capable of heating or cooling the first cooling fluid. For example, the chiller unit 30 configured as a chiller is able to provide a cold flow of the first cooling fluid to cool the battery module 26 and provide a hot flow of the first cooling fluid to heat the battery module 26. It is noted that although the chiller unit 30 shown is in fluid communication with a single charging station 14, in alternate designs, the chiller unit 30 can be configured for fluid communication with multiple charging stations at the same general location to provide heating or cooling thereto.

The charging station 14 also includes a controller 32 that controls the charging of the vehicle 12, for example, such as by identifying the type of vehicle, determining the charging rate, monitoring temperature through temperature sensors (not shown), and other monitoring capabilities, as desired. The charging system 10 includes a station charging connector or a first charging connector 34 electrically coupled to the battery charger 28 by a first portion or a first electrical line 36 of the electrical line 20, which would include both a hot line and a ground line for DC charging or alternating lines for AC charging. The first charging connector 34 is electrically connectable and detachable to a vehicle charging connector or a second charging connector 40 that is on the vehicle 12 and is electrically coupled to the battery module 26 by a second portion of the electrical line 20 or a second electrical line 42 that also includes a hot line and a ground line for DC charging or alternating lines for AC charging.

Figure 3:
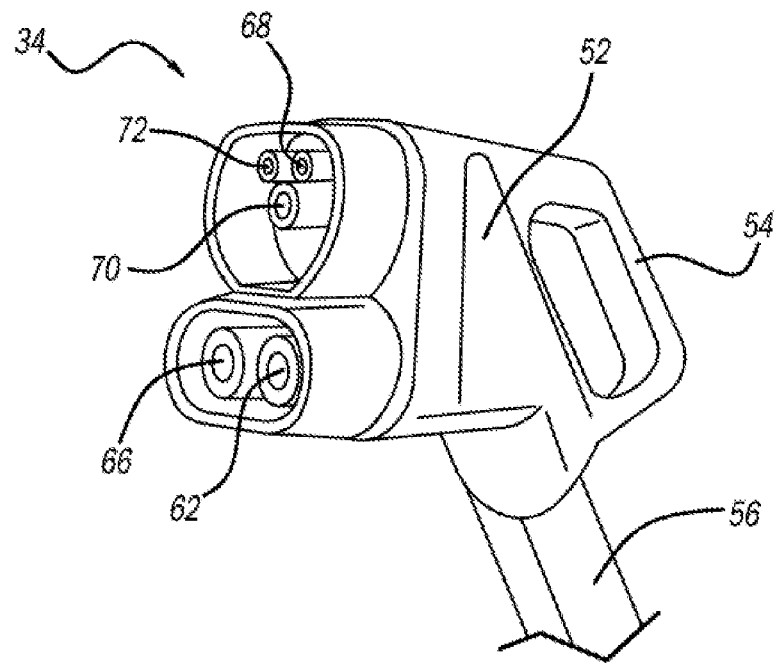
FIG. 3 is a front perspective view of a charging connector in the vehicle charging system of FIGS. 1-2.
Figure 4:
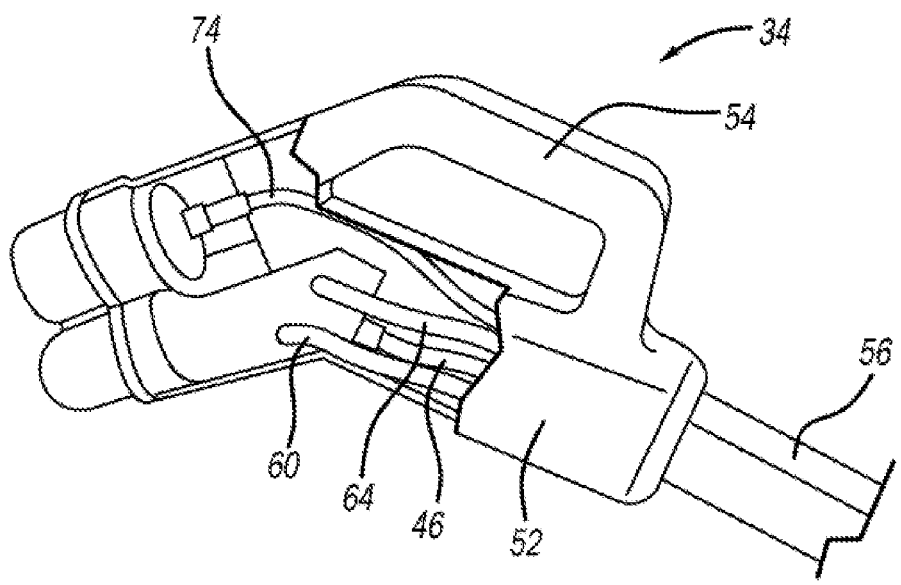
FIG. 4 is a left side perspective view with a portion partially removed of the charging connector shown in FIG. 3.

FIGS. 3-4 show the first charging connector 34 according to an embodiment of the present disclosure. The first charging connector 34 includes a body 52 having a handle 54 and an enclosure 56, within which the first electrical line 36, the first electrical cooling delivery line 46, and the first electrical cooling return line 48 are confined. The first electrical line 36 is shown as including a hot line 60 connected to port 62 and a ground line 64 connected to port 66. The respective lines 46, 48 are in fluid communication with each other in the body 52. The first charging connector 34 also includes three communications ports 68, 70 and 72 that connect processors (not shown) on the vehicle 12 to the controller 32 to transfer data, messages, etc. therebetween on a data line 74. It is understood, the second charging connector 40 can be similarly configured as the first charging connector 34, however, with a female connecting configuration.

With renewed reference to FIG. 2, the electrical line 20 is cooled using the first cooling fluid from the chiller unit 30 in the charging station 14. As a result of using the first cooling fluid to cool the electrical line 20, a diameter of the first electrical line 36 can be reduced from prior art lines. As shown, a cooling fluid delivery hose or a first electrical cooling delivery line 46 and a cooling fluid return hose or a first electrical cooling return line 48 are provided adjacent to the first electrical line 36 and provide an electrical line cooling loop between the first charging connector 34 and the chiller unit 30. As shown, the first electrical cooling delivery line 46 extends from the delivery line 16 and the first electrical cooling return line 48 extends from the return line 18. In alternate embodiments, not shown, the first electrical cooling delivery line 46 can be positioned in contact with the first electrical line 36 and the first electrical cooling return line 48 can be spaced some distance from the first electrical line 36.

A pump 78 causes the first cooling fluid to flow from a reservoir (not shown) in the chiller unit 30 into the delivery line 16 (hereinafter, also designated as a first delivery line 16). The first delivery line 16 and the return line 18 (hereinafter, also designated as a first return line 18) are connected to the chiller unit 30 and to a charging station cooling connector or first cooling connector 80. The first cooling connector 80 is removably coupled to a vehicle cooling connector or a second cooling connector 82 through no-drip sealing couplers 84, 86. As used herein, no-drip sealing couplers refer to self-sealing couplers or connectors that can be pneumatically, electrically, or mechanically controlled to seal upon decoupling of the first cooling connector 80 from the second cooling connector 82 to militate against the first cooling fluid leaking from the connectors 80, 82. In other embodiments, it is understood the first cooling connector 80 can be directly coupled to the second cooling connector 82 without the no-drip sealing couplers 84, 86.

A sensor 88 is provided on the second cooling connector 82 that sends a signal to the on-board controller (not shown) when the first cooling connector 80 is connected to the second cooling connector 82 that provides warning to a user of the vehicle 12 or controls movement of the vehicle 12 to prevent the vehicle 12 being driven away from the charging station 14 with the first delivery line 16 and the first return line 18 connected to the vehicle 12. As a result, the sensor 88 prevents damage to the vehicle 12, the connectors 80, 82, the lines 16, 18 and/or the charging station 14.

A heat exchanger 90, configured as a coolant-to-coolant heat exchanger, is provided on the vehicle 12 and receives the first cooling fluid transferred from the first delivery line 16 and through the connectors 80, 82 by a delivery hose or a second delivery line 92. The heat exchanger 90 can be any heat exchanger suitable for the purposes discussed herein, such as a compact heat exchanger including stacked aluminum plates that are brazed together and having coolant channels, for example. In other examples, the heat exchanger 90 can includes tubes and coolant channels or any other configuration for transferring heat between fluids. The heat exchanger 90 conveys the first cooling fluid by a return hose or a second return line 94 through the connectors 82, 80 to the first return line 18.

The battery module 26 receives a flow of a second cooling fluid (indicated by dashed arrows) from a vehicle cooling source (not shown) via a pump (not shown). The second cooling fluid can be any cooling fluid such as water, air, glycol, dielectric fluid, refrigerant, coolant, or any other cooling fluid or combination thereof. The battery module 26 is in fluid communication with the heat exchanger 90, wherein the heat exchanger 90 conveys the second cooling fluid to the battery module 26 through a hose or battery module delivery line 100 and the heat exchanger 90 receives the second cooling fluid from the battery module 26 through a hose or a battery module return line 94.

The chiller unit 30, the lines 16, 18, 92 and 94, the heat exchanger 90 and the connectors 80, 82 form a first coolant circuit 210. The first coolant circuit 210 can be open and closed by the connectors 80, 82. When the connectors 80, 82 are decoupled, the first coolant circuit 210 is divided into a first portion and a second portion. The first portion of the first coolant circuit 210 includes the chiller unit 30, the lines 16, 18, and the first cooling connector 80 and the second portion of the first coolant circuit 210 includes the heat exchanger 90, the lines 92, 94, and the second cooling connector 82. The first portion of the first coolant circuit 210 is disposed outside of or at a distance from the vehicle 12 and the second portion of the first coolant circuit 210 is disposed within the vehicle 12. However, it is understood, in certain embodiments the second portion of the first coolant circuit 210 can be directly adjacent or engaging the vehicle 12.

Likewise, the battery module 26, the lines 100, 102, and the heat exchanger 90 make up an in-vehicle battery coolant circuit or second coolant circuit 200. The first coolant circuit 210 and the second coolant circuit 200 are in heat transfer communication with each other but not fluid communication with each other. Therefore, the second cooling fluid in the second coolant circuit 200 is prevented from being contaminated from the first cooling fluid from the chiller unit 30 and issues caused by airlocks within cooling battery cooling systems are reduced.

During charging of the battery module 26, when the battery module 26 is desired to be cooled, the cooling connectors 80, 82 are coupled to each other and the charging connectors 34, 40 are coupled to each other. The battery charger 28 is electrically connected to the battery module 26 by the electrical line 20. When the chiller unit 30 is configured to cool the first cooling fluid, the battery module 26 conveys a hot flow of the second cooling fluid to the heat exchanger 90 through the battery module return line 102 and a cold flow of the second cooling fluid is conveyed from the heat exchanger 90 back to the battery module 26 through the battery module delivery hose 100.

Concurrently, the chiller unit 30 provides the cold flow of the first cooling fluid through the first delivery line 16 which is conveyed to the second delivery line 92 via the connectors 80, 82. Heat from the hot flow of the second cooling fluid delivered to the heat exchanger 90 from the battery module 26 is transferred to the cold flow of the first cooling fluid flowing through the second delivery line 92 via the heat exchanger 90. A hot flow of the first cooling fluid from the heat exchanger 90 is then conveyed through the second return line 94 to the first return line 18 through the connectors 80, 82. The hot flow of the first cooling fluid is then conveyed back to the chiller unit 30 to be cooled.

Concurrently, the cold flow of the first cooling fluid from the chiller unit 30 is also conveyed to the first electrical cooling delivery line 46. The first electrical line 36 conveys heat to the cold flow of the first cooling fluid flowing through first electrical cooling delivery line 46. The hot flow of the cooling fluid, as a result of the heat transferring from the first electrical line 36 to a first electrical cooling delivery line 46, is conveyed through the first charging connector 34 back to the chiller unit 30 for the first cooling fluid to be cooled.

During charging of the battery module 26, when the battery module 26 is desired to be heated, the cooling connectors 80, 82 are coupled to each other and the charging connectors 34, 40 are coupled to each other. The battery charger 28 is electrically connected to the battery module 26 by the electrical line 20. When the chiller unit 30 is configured as a heater to heat the first cooling fluid, the hot flow of the first cooling fluid flows from the chiller unit 30 and through the first delivery line 16 and the second delivery line 92 via the connectors 80, 82, to the heat exchanger 90. Heat from the hot flow of the first cooling fluid is transferred to the second cooling fluid in the battery module delivery line 100. Heat from a hot flow of the second cooling fluid flowing through the battery module delivery line 100 is transferred to the battery module 26. A cold flow of the second cooling fluid is then conveyed back to the heat exchanger 90 through the battery module return line 102. A cold flow of the first cooling fluid is conveyed through the second return line 94 and the first return line 18 via the connectors 80, 82 and back to the chiller unit 30 for heating. Concurrently, the first electrical line 36 can be heated via the first electrical cooling delivery line 46, if desired.

In certain embodiments, the heat exchanger 90 can be provided proximate to the second cooling connector 82 so that the lines 92, 94 are short, which limits the volume of the first cooling fluid left on the vehicle 12 after the first cooling connector 80 is disconnected from the second cooling connector 82.

The first charging connector 34 and the first cooling connector 80 can be separate or combined into a single connector 300, wherein the first charging connector 34 and the first cooling connector 80 are formed in an integrally formed body.

In another embodiment, the second coolant circuit 200 can be in fluid communication with a second electrical cooling delivery line 104 (indicated by dashed lines) extending from the battery module delivery line 100 and a second electrical cooling return line 106 (indicated by dashed lines) extending from the battery module return line 102. The second electrical cooling delivery line 104 exchanges heat between the second electrical line 42 to one of cool or heat the line depending on the cooling or the heating operation of the chiller unit 30. As a result, a diameter of the second electrical line can be reduced from prior art electrical lines. In another embodiment, not illustrated, the heat exchanger 90 could be replaced with a coolant-to-coolant-to-coolant heat exchanger to combine the operation of the heat exchanger 90 with an already existing heat exchanger in a battery management system on the vehicle 12.

As mentioned above, the chiller unit 30 can heat or cool the first cooling fluid. The chiller unit 30 may heat the first cooling fluid to convey to the heat exchanger 90 to heat the second cooling fluid flowing through the battery module 26 for those times that the temperature of the battery module 26 is too low to be charged. Particularly, the battery module 26 needs to be above a minimum temperature in order to be charged. If the battery module 26 is not at that temperature, the battery module 26 can first be heated by the hot flow of the second cooling fluid, heated by the hot flow of the first cooling fluid provided by the chiller unit 30, until its temperature is acceptable to allow charging to start. Once the charging connectors 34, 40 are coupled together and the charging of the battery module 26 has begun, the battery module 26 can then be cooled for fast charging in the manner discussed above, wherein the chiller unit 30 cools the first cooling fluid. Sensors (not shown) in the vehicle 12 will communicate with the controller 32 in the chiller unit 30 to control the temperature of the first cooling fluid flowing to the heat exchanger 90 depending on the temperature of the battery module 26.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A vehicle, comprising:
 a battery module;
 a first coolant circuit conveying a first cooling fluid therethrough, wherein the first coolant circuit includes a first electrical cooling delivery line and a first electrical cooling return line;
 a second coolant circuit conveying a second cooling fluid therethrough, the second coolant circuit configured for heat transfer communication with the battery module, the battery module and the second cooling fluid exchanging heat therebetween, wherein the second coolant circuit is in fluid communication with a second electrical cooling delivery line and a second electrical cooling return line; and
 a heat exchanger exchanging heat between the first cooling fluid and the second cooling fluid, wherein the first coolant circuit includes a first cooling connector configured to cooperate with a second cooling connector to open and close the first coolant circuit, wherein the battery module of the vehicle is electrically coupled to a charging connector by an electrical line, wherein at least a portion of the electrical line is in heat transfer communication with the second coolant circuit.

2. The vehicle of claim 1, wherein the first cooling connector is disposed in a first portion of the first coolant circuit including a chiller unit and the second cooling connector is disposed in a second portion of the first coolant circuit including the heat exchanger, and wherein the first portion of the first coolant circuit and the second portion of the first coolant circuit are in fluid communication when the first cooling connector and the second cooling connector are coupled to each other.

3. The vehicle of claim 1, wherein the first cooling connector and the second cooling connector are coupled to each other by no-drip sealing couplers.

4. The vehicle of claim 1, wherein the second cooling connector includes a sensor in signal communication with a controller controlling a movement of the vehicle.

5. The vehicle of claim 1, wherein the first electrical cooling delivery line engages a first portion of the electrical line and the first electrical cooling return line is spaced from the first portion of the electrical line.

6. The vehicle of claim 1, wherein the first charging connector includes a body receiving a portion of the electrical line, a portion of the first electrical cooling delivery line, and a portion of the first electrical cooling return line.

7. The vehicle of claim 6, wherein the body includes the first cooling connector.

8. The vehicle of claim 1, wherein the electrical line is in heat exchange communication with the second electrical cooling delivery line.

9. The vehicle of claim 2, wherein the chiller unit includes a heater for heating the first cooling fluid.

10. A vehicle, comprising:
 a battery module separate from and configured to be electrically coupleable to a charging station by an electrical line, wherein the charging station includes a battery charger and a chiller unit, wherein the chiller unit, a first delivery line, a second delivery line, a first return line, and a second return line form a first coolant circuit, and wherein the battery module is in heat transfer communication with a second coolant circuit;
 a heat exchanger in heat transfer communication with the first coolant circuit and the second coolant circuit;
 a cooling connector configured to releasably couple the first delivery line to the second delivery line and the first return line to the second return line, wherein the first coolant circuit is in fluid communication with a first electrical cooling delivery line and a first electrical cooling return line, and the second coolant circuit is in fluid communication with a second electrical cooling delivery line and a second electrical cooling return line, and wherein at least a portion of the electrical line is in heat transfer communication with the second coolant circuit.

11. The vehicle of claim 10, wherein at least one of the second electrical cooling delivery line and the second electrical cooling return line is in heat transfer communication with a vehicle portion of the electrical line.

12. The vehicle of claim 11, wherein a charging station portion of the electrical line and the vehicle portion of the electrical line are releasably coupled to each other by a pair of charging connectors.

13. The vehicle of claim 12, wherein a first one of the pair of electrical connectors receiving the charging station portion of the electrical line and a first one of the pair of cooling connectors receiving the first delivery line and the first return line are integrally formed.

14. A vehicle, comprising:
a first coolant circuit including a cooling connector fluidly connected to a delivery line and a return line, wherein the first coolant circuit is configured to convey a first cooling fluid therethrough;
a second coolant circuit in fluid communication with an electrical cooling delivery line, wherein the second coolant circuit is configured to convey a second cooling fluid therethrough, and wherein the second coolant circuit is in heat transfer communication with a battery module of the vehicle and the first coolant circuit; and
a charging connector in electrical communication with the battery module via an electrical line, wherein at least a portion of the electrical line is in heat transfer communication with the second coolant circuit.

15. The vehicle of claim 14, wherein the second coolant circuit further includes at least one of a battery module delivery line, a battery module return line, and an electrical cooling return line.

16. The vehicle of claim 14, wherein the at least the portion of the electrical line is in heat exchange communication with the electrical cooling delivery line.

17. The vehicle of claim 14, further comprising a heat exchanger configured to exchange heat between the first cooling fluid and the second cooling fluid.

18. The vehicle of claim 14, wherein the first coolant circuit and the second coolant circuit are fluidly disconnected.

* * * * *